(12) United States Patent
Cudak et al.

(10) Patent No.: US 9,078,134 B2
(45) Date of Patent: Jul. 7, 2015

(54) SECURITY RECOMMENDATIONS FOR PROVIDING INFORMATION IN A COMMUNICATION SYSTEM

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/012,168

(22) Filed: Aug. 28, 2013

(65) Prior Publication Data
US 2015/0065087 A1 Mar. 5, 2015

(51) Int. Cl.
*H04M 1/56* (2006.01)
*H04M 15/06* (2006.01)
*H04W 12/08* (2009.01)

(52) U.S. Cl.
CPC ..................... *H04W 12/08* (2013.01)

(58) Field of Classification Search
CPC ......... H04M 1/57; H04M 1/575; H04M 1/66; H04M 3/436; H04M 1/26
USPC ............. 379/142.01, 142.05, 142.06, 142.15, 379/207.13, 207.15
See application file for complete search history.

(56) References Cited

U.S. PATENT DOCUMENTS

| | | | |
|---|---|---|---|
| 6,757,372 B1 | 6/2004 | Dunlap et al. | |
| 7,092,508 B2 | 8/2006 | Brown et al. | |
| 7,489,766 B2 | 2/2009 | Morganstein et al. | |
| 8,116,745 B2 | 2/2012 | Lee | |
| 8,280,025 B2 | 10/2012 | Sharpe et al. | |
| 2008/0181379 A1* | 7/2008 | Chow et al. | 379/142.05 |
| 2011/0170680 A1* | 7/2011 | Chislett et al. | 379/142.06 |
| 2012/0230479 A1 | 9/2012 | Martin | |
| 2012/0244885 A1 | 9/2012 | Hefetz | |
| 2012/0257002 A1 | 10/2012 | Stocker | |
| 2012/0296651 A1 | 11/2012 | Wang | |
| 2012/0296713 A1 | 11/2012 | Abdulhayoglu | |
| 2012/0307993 A1* | 12/2012 | Masters | 379/142.04 |
| 2014/0105373 A1* | 4/2014 | Sharpe | 379/142.05 |

FOREIGN PATENT DOCUMENTS

| | | |
|---|---|---|
| EP | 2153637 A2 | 2/2010 |
| EP | 2533486 A1 | 6/2011 |
| EP | 1757068 B1 | 2/2012 |

OTHER PUBLICATIONS

IBM, "Incoming Telephone Call Verification Passcode", IP.com Prior Art Database, Sep. 29, 2005. IP.com No. IPCO000129161D.

* cited by examiner

*Primary Examiner* — Quoc D Tran
(74) *Attorney, Agent, or Firm* — Edward J. Lenart; Katherine S. Brown; Kennedy Lenart Spraggins LLP

(57) ABSTRACT

A method of and system for receiving a communication is disclosed. A receiving device receives the communication. The method and system classify user information into a set of security levels. A caller from a source of potential callers is associated with a security rating within the set of security levels. Using at least one caller-identification resource, the communication can be identified as being related to the caller with the security rating. The method and system determine a recommendation for providing user information. The recommendation may be based on the security rating within the set of security levels. The determined recommendation for providing user information in response to the communication is issued.

14 Claims, 4 Drawing Sheets

SECURITY RECOMMENDATIONS FOR PROVIDING INFORMATION IN A COMMUNICATION SYSTEM

TECHNICAL FIELD

This disclosure relates generally to communications systems and, more particularly, relates to management in receiving a communication.

BACKGROUND

The proliferation of unwanted or devious communications is significant. Many unwanted communications are originated by marketing organizations, spammers, or criminals. As unwanted or devious communications proliferate, the need for management in receiving communications increases.

SUMMARY

Aspects of the disclosure relate to a methodology for receiving a communication and using various pieces of information (e.g., social media, previous conversations, validation of a caller) in order to provide indications as to which or what types of information to provide (or not to provide) to the caller. The indications may be visual (though other forms are contemplated) by displaying on a receiving device (e.g., phone) which type(s) of information are acceptable (or unacceptable) to discuss based on a categorization of the caller on the other end. The methodology may provide improved confidence or security in supplying or not supplying certain information to a caller.

Aspects of the disclosure include a method and system for receiving a communication. A receiving device receives the communication. The method and system classifies user information into a set of security levels. A caller from a source of potential callers is associated with a security rating within the set of security levels. Using at least one caller-identification resource, the communication can be identified as being related to the caller with the security rating. The method and system determine a recommendation for providing user information. The recommendation may be based on the security rating within the set of security levels. The determined recommendation for providing user information in response to the communication is issued. In certain embodiments, the determined recommendation may be displayed using the receiving device. The determined recommendation may be for providing user information during the communication.

DETAILED DESCRIPTION

Figure 1:
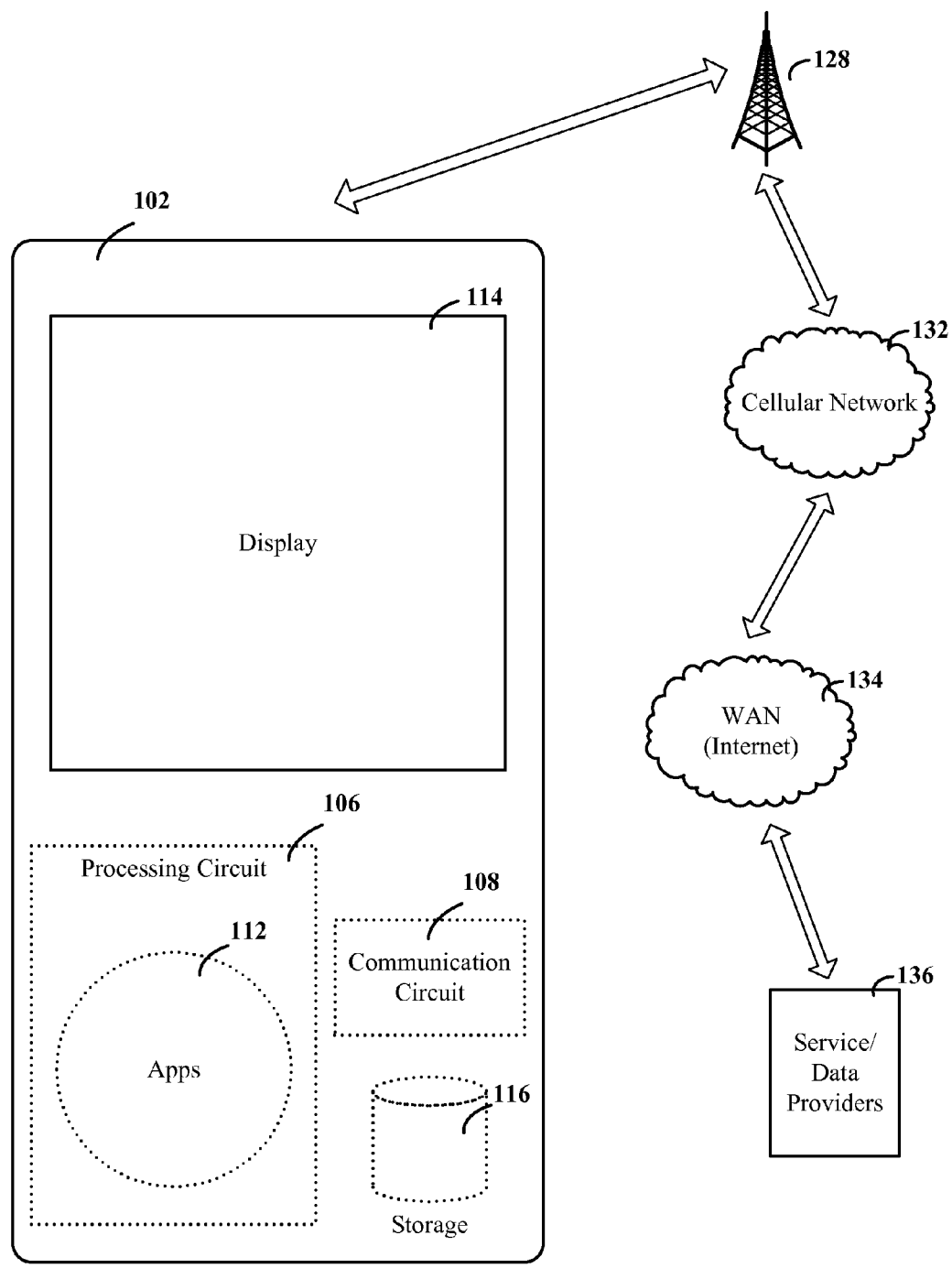
FIG. 1 illustrates an example system of communication interfaces according to embodiments.

Aspects of the disclosure relate to a methodology for receiving a communication and using various pieces of information (e.g., social media, previous conversations, validation of a caller) in order to provide indications as to which or what types of information to provide (or not to provide) to the caller. The indications may be visual (though other forms are contemplated) by displaying on a receiving device (e.g., phone) which type(s) of information are acceptable (or unacceptable) to discuss based on a categorization of the caller on other end. The methodology may provide improved confidence or security in supplying or not supplying certain information to a caller.

There are times when a person is called from an unknown number or unknown location. During a conversation, varying levels of personal information may be requested or may be a natural part of continuing a conversation (e.g., asked about kids, where you live). It is difficult to validate information about the caller and also stay alerted to the sensitivity of information being requested, especially in real time. Furthermore, there are a growing number of fraud mechanisms (e.g. internet bots, spoofing, telemarketing scams) intended for malicious purposes in an effort to gain personal user information. There may also be situations with known contacts where a callee does not intend to share personal information, but inadvertently may divulge the information. In these exemplary scenarios, it can be useful to provide a methodology that alerts the callee when these situations arise during a call. Furthermore, the methodology may determine and visually display a security rating in providing various pieces of information to a caller.

Aspects of the disclosure include a method and system for receiving a communication. A receiving device receives the communication. The method and system classifies user information into a set of security levels. A caller from a source of potential callers is associated with a security rating within the set of security levels. Using at least one caller-identification resource, the communication can be identified as being related to the caller with the security rating. The method and system determine a recommendation for providing user information. The recommendation may be based on the security rating within the set of security levels. The determined recommendation for providing user information in response to the communication is issued. In embodiments, the determined recommendation may be displayed using the receiving device. The determined recommendation may be for providing user information during the communication.

In embodiments, classifying user information into a set of security levels includes assigning user information a trust rating. The trust rating may have a score signifying a security class, a threat class, a risk class, and a privacy class. In embodiments, using at least one caller-identification-resource includes selecting one or more of a contact list, a social media application, a contact history, a phone number lookup service, or a voice print resource. In embodiments, using at least one caller-identification-resource includes selecting one or more lookup service of a reverse-number-lookup-resource, a phone number catalog, or an internet search engine configured to search for a number and a telemarketing-associated-term.

Aspects of the disclosure include validating an identity associated with the communication in response to identifying the communication as being related to the caller with the security rating. Determining the recommendation for providing user information may include comparing the security rating with a threshold assigned to each of the security levels associated with user information. In embodiments, using the receiving device to display the determined recommendation for providing user information during the communication includes listing either shareable user information or user information not to share (or both). Aspects of the disclosure may provide improved confidence or security in supplying or not supplying certain information to a caller.

FIG. 1 illustrates an example system of communication interfaces according to embodiments. A receiving device 102 (e.g., smart phone) includes a communication circuit 108. The communication circuit 108 allows the receiving device 102 to access data using cellular network 132. For example, the receiving device can interface with a local cellular tower 128. The receiving device can then retrieve data using a cellular data connection that has been established in the course of the interaction. The particular type protocol used for the cellular data connection is not limiting, but can include cellular data connections using code division multiple access (CDMA), time division multiple access (TDMA), orthogonal frequency division multiplexing (OFDM) or other communication protocols.

In certain embodiments, the receiving device 102 may request data that is made available over a wide area network (WAN) 134, such as the global Internet. For instance, service/data providers 136 can provide services such as websites, e-mail, or audio/video content. The receiving device 102 may send and receive data from such service providers 136. In other embodiments, the receiving device 102 can each communicate directly with another receiving device using the communication circuit 108 for a wireless interface. Other than communicating with the cellular network 128, the communication circuit 108 can use, but is not limited to, near field communications (NFC), WiFi/IEEE 802.11, Bluetooth/IEEE 802.15, or infrared. Accordingly, embodiments may be directed toward the use of either a point-to-point connection or a connection through a local area network (LAN).

A processing circuit 106 may be configured to execute at least one software module or application (apps) 112. The processing circuit 106 can include one or more computer processors, logic circuitry, discrete circuit components and combinations thereof. The software applications 112 can be configured to, in combination with the processing circuit 106, put into operation the methodology described according to aspects of the disclosure. For instance, the software applications 112 can provide an interface or display 114 for improved confidence or security in supplying or not supplying certain information to a caller. Aspects of the disclosure (e.g., aspects associated with the software applications 112) can be stored in a memory circuit as part of a database/storage 116.

Figure 2:
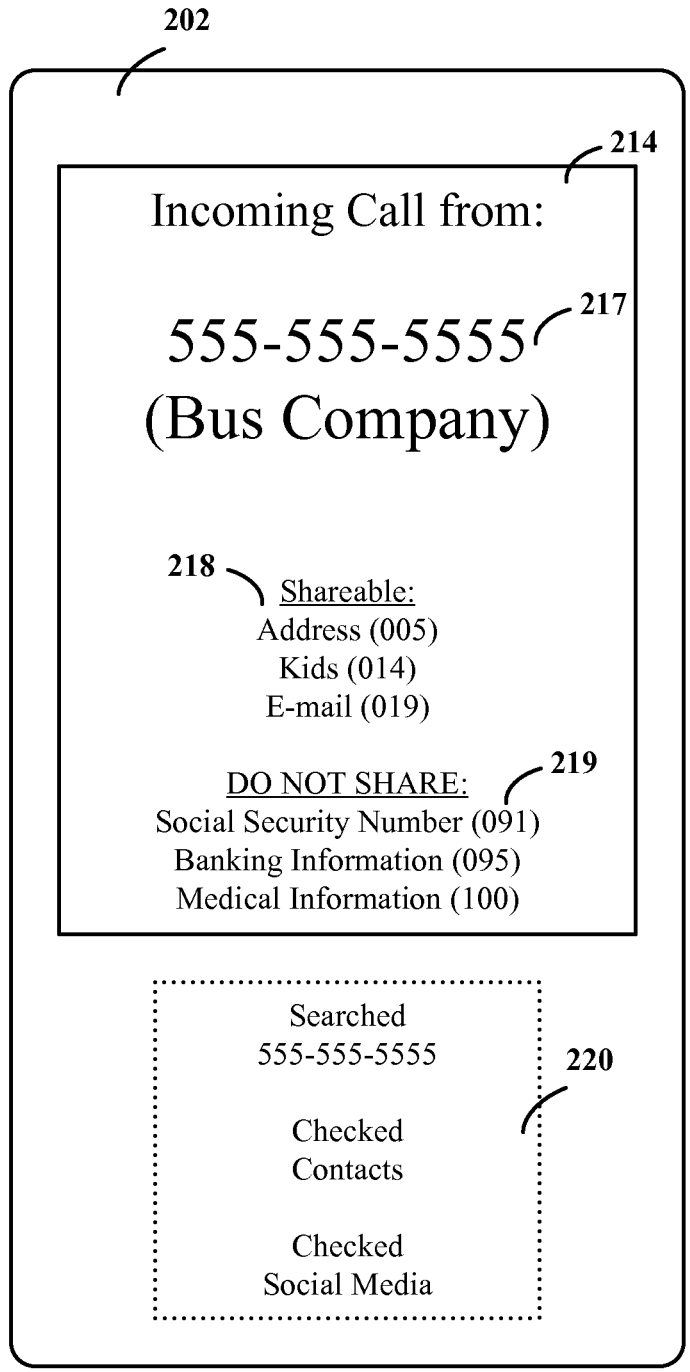
FIG. 2 illustrates an example receiving device according to embodiments.

FIG. 2 illustrates an example receiving device 202 according to embodiments. The receiving device 202 includes a display 214. The display 214 can show caller information 217 (which may be validated caller information), at least one type of information 218, and at least one security rating 219. The display 214 may visually represent a communication being received (e.g., an incoming call). Such visual representation can include a telephone number or other information (e.g., e-mail address, name of a business). In particular, the display 214 may be configured to provide indications (e.g., at least one security rating 219) as to which or what types of information 218 to provide (or not to provide) to the caller. For example, FIG. 2 suggests, using the display 214, that information 218 related to address, kids, and e-mail are shareable whereas information related to a social security number, banking information, or medical information should not be shared. These indications may be conclusions drawn by use of component 220. Component 220 may include a processing circuit, apps, etc. In the example given in FIG. 2, component 220 searched for the phone number (e.g., searched the global Internet using a search engine or phone number database), checked contacts (e.g., reviewed a contact list physically stored on the phone or on a network such as in the cloud), and checked social media (e.g., reviewed possible connections with persons/entities having profiles familiar to the receiving device). Receiving device 202 represents just one possibility to put into operation the methodology described according to aspects of the disclosure. A software application of a receiving device may operate as a computer-implemented method to determine and visually indicate a security rating in providing certain information to a caller in response to receiving a communication. The examples herein provide further potential detailed aspects according to embodiments.

Figure 3:
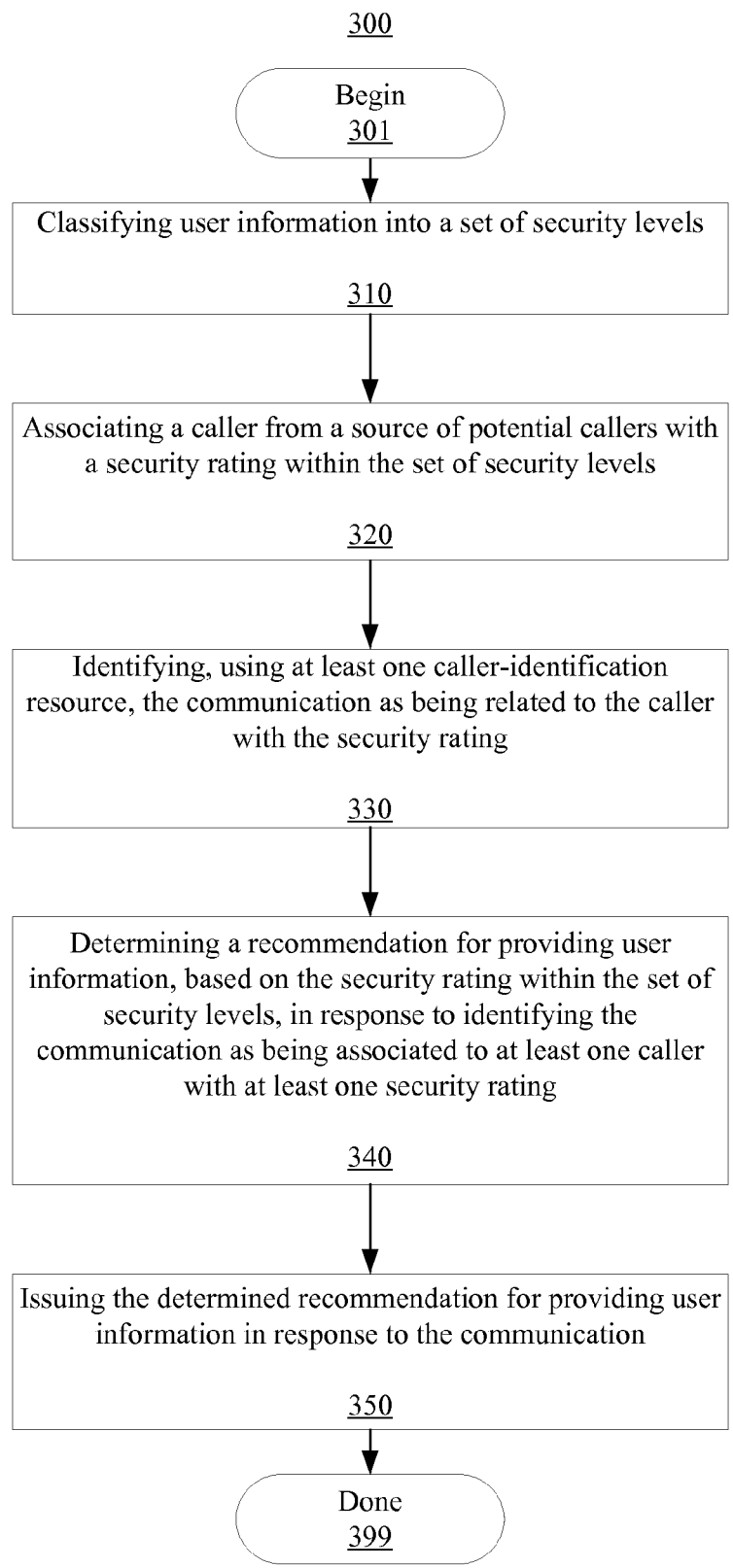
FIG. 3 is a flowchart illustrating a method for management in receiving a communication according to embodiments.

FIG. 3 is a flowchart illustrating a method 300 for management in receiving a communication (e.g., e-mail, mobile communication, short message service, text messaging, chat application, voice-call, real-time communication) according to embodiments. A receiving device receives the communication. Method 300 begins at block 301. User information (e.g., topics) is classified into a set of security levels at block 310. Initial types or topics of information may have initial settings or levels. For instance, level assignments may be made for an address, various contacts (e-mail, phone), medical information, a social security number, banking/credit card information, religious or political alignment information, family information (number, names and ages of children, marital status, etc.), or passwords. Level assignments may be specified by the callee so that the callee may add topics/categories or modify levels for existing ones. The topic/type of information level may be stored on the receiving device (e.g., smart phone), stored as data provided to an application running on the receiving device, or as a service with a carrier (e.g., for less advanced devices).

At block 320, a caller from a source of potential callers is associated with a security rating within the set of security levels. In practice, this can associate types of entities to a level of information that is acceptable. The source of potential callers may be determined (e.g., using a lookup feature) and can include a list (which may be a fixed list or an unfixed list). In embodiments, the source of potential callers can be specified (e.g., assigned) by the callee. In embodiments, the association with the security rating may be based on types of business or entities (e.g., banks in general or personal bank, charities, government actors/authorities, employer/business relationships, dealerships). The association with the security rating may be based on social networks and may include designations such as friends, friends of friends, family, members of a group or groups, particular people in a contact list, etc. The association with the security rating may be based on similarities or interests determined by social media (e.g., caller enjoys robot wars as does the callee). Religious or political similarities and interests may influence the association with the security rating in embodiments. The association with the security rating may be based on historical contact (e.g., time of day, companies or people dealt with in the past, based on a threshold or ratio of incoming and outgoing calls to that entity, whether this information has been shared with this person or company before, whether requests for this information have been denied for this person or company before). In developing the association with the security rating, companies may provide a policy (or another official directive such as a law or regulation) in a machine readable format (file) which can be used to indicate which information they may or may not ask for, for reference (companies may have a policy of not asking for passwords, in which case if a company calls a callee, that information would be flagged as not to provide or if the company is falsely identified by a phishing attempt, the policy can still notify callees to not provide a password or other information per the policy file). In embodiments, the association with the security rating can include checking a government, nonprofit, or for-profit database available by subscription or other means (e.g., publicly available) for the phone number or company name.

Using at least one caller-identification resource, the communication can be identified as being related to the caller with the security rating at block 330 (e.g., identify incoming caller and/or validate identity of caller). In embodiments, identification may include a comparison to known entities in contacts, a comparison to social media lists, or a comparison to historical events (e.g., past calls). The operation may look up information on number as a background process. Embodiments may use services which offer ability to lookup information given a number, may search in the background for existence of numbers on company websites, or may search for existence of a phone number with various terms like phishing, scam, or telemarketer. In embodiments, the operation may include a comparison with a voice print. In embodiments, in a situation where a caller cannot be identified or validated, a security rating appropriate for the situation may be in place (e.g., putting in place a predetermined or callee-defined security rating for such situations). By default, an unidentified or invalidated caller may be flagged with a security rating indicative of a high risk to the callee.

A recommendation for providing user information may be determined at block 340. The recommendation may be based on the security rating within the set of security levels. In embodiments, the operation may determine a level of data to provide based on information gathered. The operation can include a lookup categorization of a contact based on preset or callee settings. In addition, the operation can include suggestions by references and callee settings regarding the level of data to provide. In embodiments, a buffering of personal information can occur while the determination is in process (rather than sending as a given).

The determined recommendation for providing user information in response to the communication is issued at block 350. Issuing the determined recommendation may include a message or announcement. In embodiments, the determined recommendation may be displayed using the receiving device. The determined recommendation may be for providing user information during the communication. Put another way, the level or types of information acceptable to share with the caller can be displayed. Method 300 may conclude at block 399.

Figure 4:
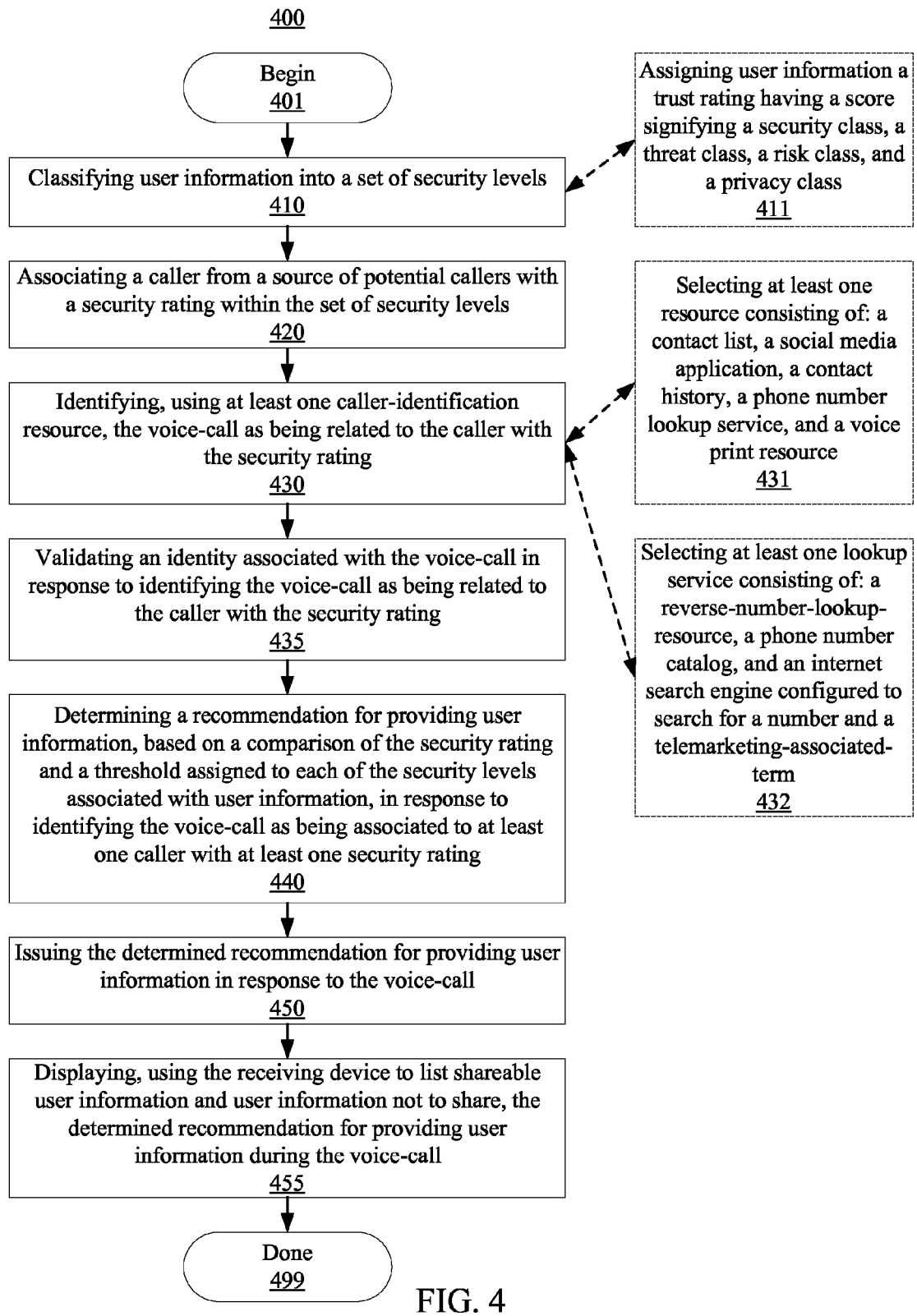
FIG. 4 is a flowchart illustrating a method for management in receiving a voice-call according to embodiments.

FIG. 4 is a flowchart illustrating a method 400 for management in receiving a voice-call (as an example communication) according to embodiments. Method 400 may be similar or the same in some aspects as method 300. Aspects of methods 300 and 400 may be interpreted interchangeably. Method 400 begins at block 401. A receiving device receives the voice-call. User information is classified into a set of security levels at block 410. User information may include information about a particular subject matter or topic. The set of security levels may range from sharing nothing to sharing anything/everything and all points or discrete steps in between (as defined by the callee or being predetermined). In embodiments, user information may be assigned a trust rating (e.g., on a scale of 0 to 100, A to F) having a score (e.g., 0 to 10) signifying a security class (e.g., unsafe, relatively secure, official use only), a threat class (e.g., little threat, caution, dangerous), a risk class (e.g., low risk, high risk), and a privacy class (e.g., need to know, official use only, secret) as at block 411.

At block 420, a caller from a source of potential callers is associated with a security rating within the set of security levels. The source of potential callers can be a list of potential callers (e.g., senders, initiators of the communication). In practice, certain entities or types of entities may be associated with a security rating (e.g., 0 to 1000, one-star to five-stars). For example, a close friend who is trusted may have a security rating significantly higher than a security rating of an acquaintance known to frequently gossip or be engaged with undesirable people. Similarly, a bank where you do business may be trusted more than a fundraising call from an out-of-town organization you have never heard of.

Using at least one caller-identification resource, the communication can be identified as being related to the caller with the security rating at block 430. In practical effect, the operation may simply match the phone number of the voice call with a name. In embodiments, caller identification resources can include a contact list, a social media application, a contact history, a phone number lookup service, and/or a voice print resource as at block 431. In embodiments, caller identification resources can include a reverse-number-lookup-resource, a phone number catalog, and/or an internet search engine configured to search for a number and a telemarketing-associated-term as at block 432. Similar configurations along these lines are also considered. At block 435, an identity associated with the voice-call may be validated in response to identifying the voice-call as being related to the caller with the security rating. For example, multiple phone numbers may be used by a given caller (e.g., multiple offices/locations at work with access to others at particular times of day) and require addition verification in certain instances (e.g., day care information and/or location regarding the whereabouts of children) prior to sharing information.

A recommendation for providing user information may be determined at block 440. The recommendation may occur in response to identifying the voice-call as being associated to at least one caller with at least one security rating. The recommendation may be based on a comparison of the security rating and a threshold assigned to each of the security levels associated with user information. For example, if the threshold of a minimum of 50 is required to share the location of an extra key to a second home and the security rating is 65, then the location of the extra key may be shared; however, the same scenario with a security rating of 35 may recommend not sharing the location of the extra key.

The determined recommendation for providing user information in response to the voice-call is issued at block 450. Issuing the determined recommendation may include a message or announcement. In embodiments, the determined recommendation may be displayed using the receiving device at block 455. The determined recommendation may be for providing user information during the voice-call. Put another way, the level or types of information acceptable to share with the caller can be displayed. Method 400 may conclude at block 499. Aspects of the disclosure may provide improved confidence or security in supplying or not supplying certain information to a caller.

In embodiments, aspects of the disclosure may be considered as generating a declaration. A methodology may exist for receiving a communication at a receiving device. The method may determine, using the receiving device and at least a first set-of-data, an identity of a sender of a communication. Next, the method may determine, using the identity and at least a second set-of-data, an attribute associated with the sender. Lastly, the method may generate, for use by the receiving device during the communication, at least one declaration that corresponds with the attribute.

In embodiments, the first set-of-data has at least one data-type selected from a group consisting of an internally-retrieved data-type and an externally-retrieved data-type. The first set-of-data can include at least one data-type selected from a group consisting of a telephone-contacts data-type, an e-mail-contacts data-type, a social-media-contacts data-type, a historical-communications-contacts data-type, a published data-type, and a searched data-type. The second set-of-data can include at least one data-type selected from a group consisting of an authentication data-type, a physical-location data-type, a contact-information data-type, a medical-information data-type, a commerce-related data-type, an identifying-related data-type, an affiliation-related data-type, and a family-related data-type.

In embodiments, the identity of the sender includes at least one person selected from a group consisting of a natural person (e.g., human) and a judicial person (e.g., corporation). The identity of the sender can at least one person selected from a group consisting of a close-family-member, a not-close-family-member, a close-friend, a not-close-friend, a close-work-associate, a not-close-work-associate, a personal-health-related-person, a home-service-related-person, a telemarketer-type-person, and a government-related-person.

In embodiments, the attribute has at least one trust score to indicate a security rating for use in protecting information. The communication may be an e-mail, mobile communication, short message service, text message, chat application, voice-call, or real-time communication.

In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A method comprising:
   by first program instructions on a first computing device,
      receiving a communication from a caller;
      selecting from a plurality of security ratings, a security rating of the caller, based on at least one caller-identification resource;
      generating a recommendation indicating a first type of user information classified as sharable with the caller and a second type of user information classified as not sharable with the caller; and
      displaying said recommendation.

2. The method of claim 1, wherein selecting from a plurality of security ratings, a security rating of the caller, based on at least one caller-identification resource includes selecting at least one resource consisting of: a contact list, a social media application, a contact history, a phone number lookup service, and a voice print resource.

3. The method of claim 1, wherein selecting from a plurality of security ratings, a security rating of the caller, based on at least one caller-identification resource includes selecting at least one lookup service consisting of: a reverse-number-lookup-resource, a phone number catalog, and an internet search engine configured to search for a number and a telemarketing-associated-term.

4. The method of claim 1 further comprising:
   classifying the user information into a set of security levels including assigning the user information a trust rating.

5. The method of claim 4, wherein the trust rating includes a score signifying a security class, a threat class, a risk class, and a privacy class.

6. The method of claim 1, wherein generating the recommendation includes comparing the security rating with a threshold assigned to each of the security levels associated with the user information.

7. A method comprising:
   by first program instructions on a first computing device,
      receiving a voice-call from a caller;
      selecting from a plurality of security ratings, a security rating of the caller, based on at least one caller-identification resource;
      generating a recommendation indicating a first type of user information classified as sharable with the caller and a second type of user information classified as not sharable with the caller; and
      displaying said recommendation.

8. The method of claim 7 further comprising:
   classifying user information into a set of security levels including assigning user information a trust rating having a score signifying a security class, a threat class, a risk class, and a privacy class.

9. An apparatus comprising:
   a processor coupled to a computer-readable storage medium, wherein said computer readable storage medium includes computer program instructions that when executed by the processor cause the apparatus to carry out the steps of:
      receiving a communication from a caller;
      selecting from a plurality of security ratings, a security rating of the caller, based on at least one caller-identification resource;
      generating a recommendation indicating a first type of user information classified as sharable with the caller and a second type of user information classified as not sharable with the caller; and
      displaying said recommendation.

10. The apparatus of claim 9, wherein selecting from a plurality of security ratings, a security rating of the caller, based on at least one caller-identification resource selecting at least one resource consisting of: a contact list, a social media application, a contact history, a phone number lookup service, and a voice print resource.

11. The apparatus of claim 9, wherein selecting from a plurality of security ratings, a security rating of the caller, based on at least one caller-identification resource selecting at least one lookup service consisting of: a reverse-number-lookup-resource, a phone number catalog, and an internet search engine configured to search for a number and a telemarketing-associated-term.

12. The apparatus of claim 9, further comprising computer program instructions that when executed by the processor cause the apparatus to carry out the steps of: classifying user information into a set of security levels including assigning the user information a trust rating.

13. The system of claim 12, wherein the trust rating includes a score signifying a security class, a threat class, a risk class, and a privacy class.

14. The system of claim 9, wherein generating the recommendation includes comparing the security rating with a threshold assigned to each of the security levels associated with user information.

\* \* \* \* \*